Jan. 11, 1944.  E. GENTE  2,338,926
TURBINE DISK
Filed Sept. 1, 1939
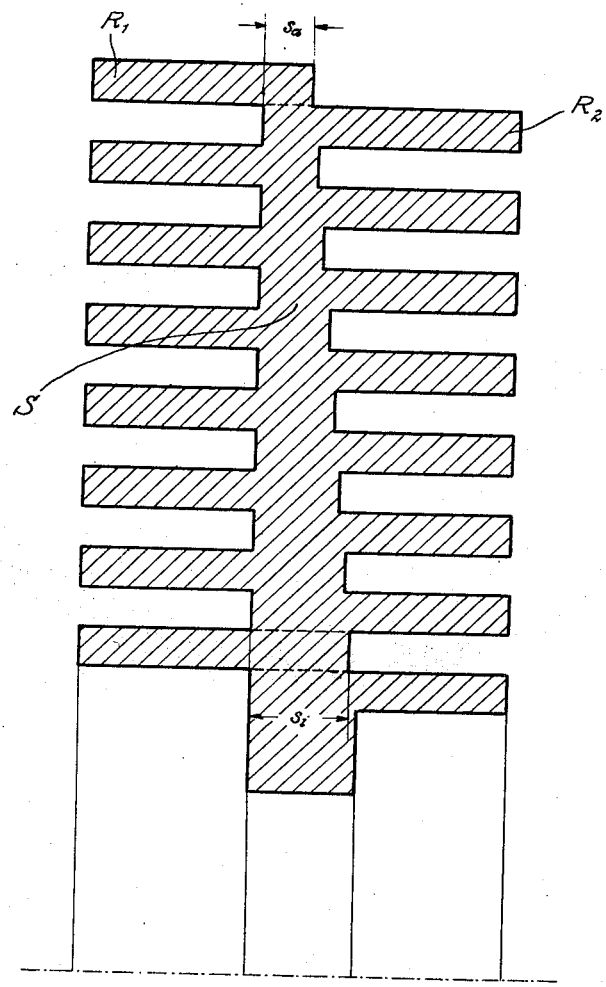
Inventor:
Ernst Gente
By: Richardson and Guer
Attys.

Patented Jan. 11, 1944

2,338,926

UNITED STATES PATENT OFFICE 2,338,926

TURBINE DISK

Ernst Gente, Berlin-Siemensstadt, Germany; vested in the Alien Property Custodian Application September 1, 1939, Serial No. 293,043
In Germany August 15, 1938

1 Claim. (Cl. 253—39)

This invention relates to steam turbines and more particularly to a disk therefor, provided at both sides with blades.

Steam turbines with radial admission of the working fluid have been proposed in which the blade rims are arranged on a disk provided with blades at one side thereof and which has such a thickness as to behave as a substantially rigid body with respect to the shearing stresses to which the disk is subjected. Thin elastic disks resistant to shearing and provided at one or both sides with blades are also known in the art. In the case of a blading at both sides of the disk, webs which deform approximately in the form of an S as a result of the shearing forces acting thereon are provided between the blade rings, regardless of whether the blade rings are arranged in staggered relation or not. The deformation may, however, be considerably reduced by arranging the blade rings on both sides of the disk in stepped relation in such a manner that the outer diameter of the ring at one side is equal to the inner diameter of the following ring of the other side. In this manner the webs are eliminated and the disk becomes more rigid.

The essence of the present invention resides in the provision of an arrangement wherein the staggered blade rings overlap one another an amount which is the greater, the higher the stress will be. A disk is thus obtained having a cross-section formed substantially in the shape of a cone.

One embodiment of the invention is described below with reference to the accompanying drawing, which is a radial section, of a turbine disk having blade rings which extend laterally from the body of the disk.

The blade rings $R_1$ arranged on the one side and the blade rings $R_2$ on the other side are machined from the material of the disk S. The disk to which the working fluid is admitted at both sides thereof is naturally stressed to a greater extent at the root than at the outer periphery. In order to take this fact into consideration the disk is designed according to the invention in the following manner: The blade ring $R_1$ and the blade ring $R_2$ overlap each other by an amount $s_a$. This amount of overlap is not constant throughout the entire diameter of the disk but increases with increasing stress, so that the greatest stress is taken up by the overlap $s_1$. A new disk type is thus obtained which is neither a rigid disk nor an elastic disk in the previously known sense but which is resistant to shearing in accordance with the stresses acting thereon.

The amount by which the overlap is to be increased is a matter to be judged by the designer in accordance with the permissible values of the strength of the material.

What is claimed is:

In a radial flow elastic fluid turbine or the like, a radially extending disk which is in operation impinged upon by the elastic fluid under pressure acting predominantly upon one side thereof and producing shearing stresses in the disk which decrease progressively in a radial direction from the root to the rim thereof, a plurality of blade rings extending from one side of said disk integral therewith and radially spaced thereon, the inner ends of the sides of said blade rings being disposed on said disk along points of radially progressively step-like decreasing distances with respect to the radial median center line of the disk as measured from the root of the disk to the rim thereof, the amounts of said distances being definitely related to the progressively decreasing shearing stresses resulting in said disk due to the action of said elastic fluid thereon so as to compensate for such stresses, and the outer ends of said blade rings being disposed in a common plane paralleling the radial median center line of said disk, together with a plurality of blade rings extending from the opposite side of said disk integral therewith and radially spaced thereon, the inner ends and the outer ends of the sides of said last named blade rings being disposed in common planes paralleling the radial median center line of the disk.

ERNST GENTE.